Figure 1:
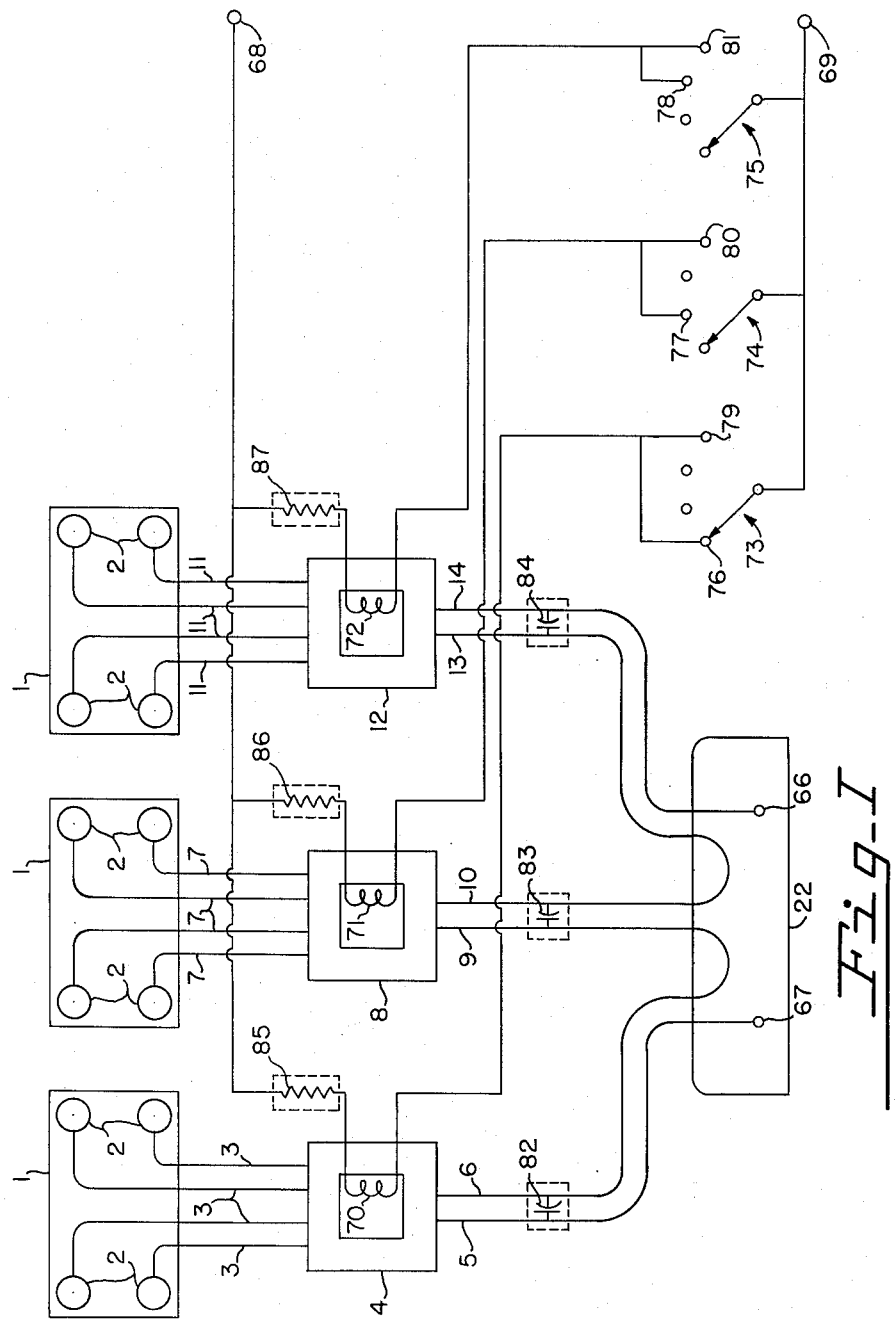

April 3, 1962

R. F. ORR 3,027,957

WEIGHING SYSTEM

Filed March 29, 1960

2 Sheets-Sheet 1

INVENTOR.
ROBERT F. ORR

BY

Marshall & Wilson

ATTORNEYS

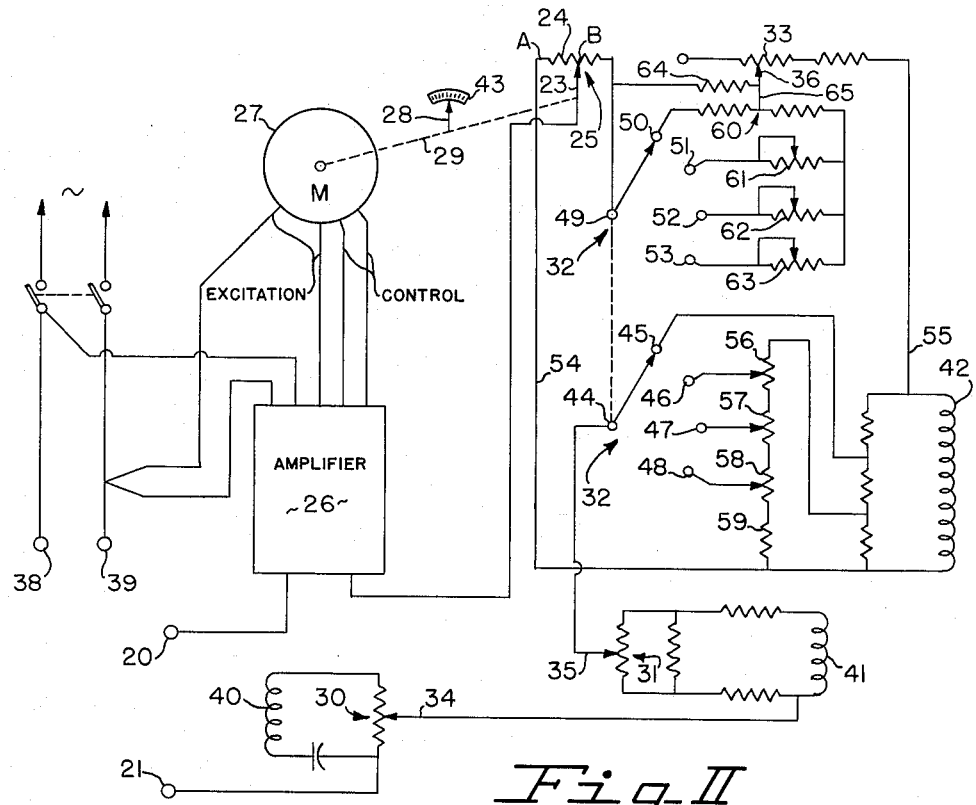
Fig. II
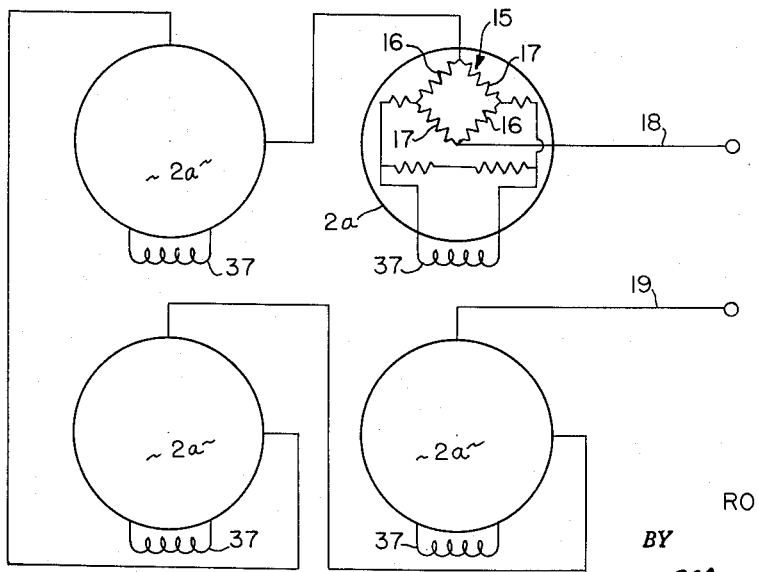
Fig. III
INVENTOR.
ROBERT F. ORR
BY
Marshall & Wilson
ATTORNEYS

3,027,957
WEIGHING SYSTEM
Robert F. Orr, Toledo, Ohio, assignor to Toledo Scale Corporation, Toledo, Ohio, a corporation of Ohio
Filed Mar. 29, 1960, Ser. No. 18,304
10 Claims. (Cl. 177—211)

This invention relates to weighing scales and in particular to a weighing system having a plurality of weighing stations which are operatively connected to a single scale head.

The weighing system is especially suitable for weighing motor trucks and trailers, three weighbridges being provided in such case, one for each set of wheels on a truck tractor and one for the wheels on a trailer pulled by the tractor. Each of such weighbridges is supported on transducer means producing an output voltage which is a function of load applied to the weighbridge, there being adjustable means in circuit with the transducer means for supplying a balancing voltage in opposition to the output voltage, servo means in circuit with both the transducer means and the adjustable means for adjusting the adjustable means in a balancing direction in response to differences between voltages, and a member coupled to the servo means movable according to the balancing voltage in terms of weight.

In all electrical and electronic weighing scales of the foregoing type the output voltage from the transducer means is shifted in phase relative to the balancing voltage from the adjustable means, the output voltage from the transducer means leading or lagging the reference or balancing voltage from the adjustable means because each of the transducer means and its associated circuitry has its own peculiar circuit characteristics, since each weighing scale has its own particular lengths of cable, transducer internal resistances and wire resistances, and transformer inductances and resistance of the reference voltage wire or excitation wire for the transformer. Ideally at balance, the transducer output voltage and the reference or balancing voltage are equal and opposite, i.e., 180 degrees apart. However, it is only by the most remote chance that the inherent circuit characteristics of the transducer means and its associated circuitry could be such that there is no phase shift in the weight signal. Hence, in all electrical and electronic weighing scales there is a phase shift in the weight signal and such phase shift must be compensated to get accurate weight readings.

In the usual electrical or electrical weighing scale which has only a single weighing station, phase shift in the weight signal is simple to compensate because the phase shift is fixed for all practical purposes, i.e., the phase shift is fixed because the weighing scale has only a single weighing station with a constant source impedance. If the out-of-phase transducer output voltage is resolved into two components, a first 180 degrees and a second 90 degrees apart from the reference or balancing voltage, the first component will be canceled but the second cannot be canceled by the reference or balancing voltage. Such second component, i.e., the 90 degree phase component, is well known as the quadrature component and is substantially canceled in the usual single-weighing-station scale having a constant source impedance by suitable means. In actual practice, such suitable means functions to adjust the quadrature voltage to a level which will not affect gain of the system's amplifier, i.e., saturate the amplifier. As long as the amplifier is not saturated, the system's servo motor is not affected by stray quadrature voltage so that the system can tolerate a certain amount of quadrature voltage. Saturation of the amplifier causes the system to become inaccurate and sluggish.

Heretofore, there has been no practical electrical or electronic weighing system having a plurality of weighing stations operatively connected to a single scale head. Such a system is particularly well suited for weighing motor trucks and trailers, three weighing stations being provided in such case, one for each set of wheels on a truck tractor and one for the wheels on a trailer pulled by the tractor. If each of the weighing stations when connected to the adjustable means in the single scale head for supplying a balancing voltage in opposition to the transducer output voltage is considered as an ordinary electrical or electronic scale one can see, since each of the weighing stations produces weight signals having its own peculiar phase shift, that every time one of the weighing stations is substituted in the system for another the means for adjusting the quadrature voltage has to be readjusted. This is impracticable. That is, when the transformer primaries in such a system, there being one primary for each weighing station, are energized at once and each individual weighing station is connected successively to the scale head circuitry to obtain three axle load measurements and simultaneously to the scale head circuitry to obtain a measurement of the total weight an impracticable system results because there is a different phase shift associated with each of the four measurements.

Hence, in the ordinary electrical or electronic weighing scale which has only a single weighing station, phase shift in the weight signal is simple to compensate because the phase shift is fixed. However, if such a weighing scale is provided with several weighing stations and each weighing station is connected successively to the scale head circuitry forming, in effect, several ordinary weighing scales and then connected simultaneously to the scale head circuitry forming, in effect, still another ordinary weighing scale, phase shift in the weight signals are not simple to compensate because there is a different phase shift associated with each of the weighing stations.

It is, accordingly, the principal object of this invention to provide an electrical or an electronic weighing system having a plurality of weighing stations operatively connected to a single scale head, the scale head functioning to read out any one or any combination of the weighing stations.

Another object of the invention is to provide an electrical or electronic weighing system having a plurality of weighing stations each with transducer means having an output voltage or weight signal which is a function of load applied to the transducer means so arranged that the weighing stations anyone alone or in any combination produce a weight signal having a fixed phase shift that, because it is fixed, is simple to compensate for.

A further object is to provide an electrical or electronic weighing system having a plurality of weighing stations each with transducer means and associated circuitry so arranged that there is a constant source impedance regardless of the number of stations in operation.

Still another object is to provide an improved circuit for correcting phase shift in a weight signal.

More specific objects and advantages are apparent from the following description of a specific embodiment of the invention.

According to the invention, an electrical or electronic weighing system is provided having a plurality of weighing stations but only a single scale head. Each of the weighing stations has transducer means having an output voltage or weight signal which is a function of load applied to the transducer means and a transformer primary for the transducer means connected to a source of alternating current and the scale head contains a servo system, the transducer means in the several weighing stations being connected in series circuit to the servo system. Phase shift in the weight signals from the several weighing stations, whether leading or lagging, is corrected by means of novel circuit means without affecting linearity of the system. Lead in any weighing station is corrected by increasing cable capacity. Lag in any weighing station is corrected by increasing the resistance of the transformer primary. Any phase shift which may appear after the corrections are made is fixed because of the series circuit arrangement.

In operation, the transformer primaries, there being one primary for each of the weighing stations, are energized successively producing output voltages or weight signals which are functions of loads applied to the respective weighing stations and are energized simultaneously producing an output voltage or weight signal which is a function of the total load applied to the several weighing stations. Because of the series circuit arrangement, the transformer primaries can be energized any one alone or in any combination to produce weight signals having a fixed phase shift that, because it is fixed, is simple to compensate.

A preferred embodiment of the invention is illustrated in the accompanying drawings. In the drawings:

FIG. I is a schematic wiring diagram showing an electronic weighing system having three weighing stations and one scale head;

FIG. II is a schematic wiring diagram showing a servo system which is contained in the scale head shown in FIG. I; and FIG. III is a schematic wiring diagram showing an alternative arrangement from that shown in FIG. I for connecting four strain gage load cells in series.

These specific figures and the accompanying description are intended merely to illustrate the invention and not impose limitations on the claims.

Referring to FIG. I, an electronic weighing system embodying the invention includes three pits or weighing stations 1, one for each set of wheels on a truck tractor and one for the wheels on a trailer pulled by the tractor. Four strain gage load cells 2 are located in each of the pits 1, the load cells in each set of four being arranged in the form of a rectangle and being adapted to support a weighbridge (not shown) of a size to accommodate axle loads. Any electrical or transducer means may be substituted for the strain gage load cells which will produce an output voltage which is a function of load applied to the respective weighbridge.

Leads 3 from the load cells 2 in the left hand pit 1 as viewed in FIG. I are so connected in series in a housing 4 that an output voltage or weight signal is developed between the leads 5 and 6 extending from the housing 4 which is a function of load applied to the four series connected load cells in the left hand pit 1. Similarly, leads 7 from the load cells 2 in the middle one of the pits 1 are so connected in series in a housing 8 that an output voltage or weight signal is developed between the leads 9 and 10 extending from the housing 8 which is a function of load applied to the four series-connected load cells in the middle pit 1 and leads 11 from the load cells 2 in the right hand pit 1 are so connected in series in a housing 12 that an output voltage or weight signal is developed between the leads 13 and 14 extending from the housing 12 which is a function of load applied to the four series-connected load cells in the right hand pit 1. It is not necessary that the load cells 2 in each of the pits 1 be connected in series circuit in a housing. Any arrangement is suitable as long as the four load cells in each of the pits are connected in series circuit. An alternative arrangement for connecting four strain gage load cells in series circuit is shown in FIG. III.

Referring to FIG. III, four strain gage load cells 2a are connected in series and each comprises a resistance wire strain gage bridge 15, only one of which is shown, having resistance elements 16 in two of its legs and resistance elements 17 in the other two legs. The bridges 15 are of an ordinary type used in gages available for measuring strain wherein the elements 16 and 17 are adapted to change in resistance with changes in the condition to be measured, i.e., load applied to the load cells 2a.

In order that measurements of load applied to the load cells 2a may be obtained, there are provided leads 18 and 19 from the output terminals of the series-connected bridges 15. An output voltage or weight signal is developed between the leads 18 and 19 which is a function of the total load applied to the four load cells 2a. If the leads 18 and 19 are connected to the terminals 20 and 21, respectively, of the servo system shown in FIG. II an ordinary strain gage load cell weighing scale results. The servo system is located within a scale head 22 (FIG. I).

Leads 18 and 19, when connected to terminals 20 and 21, respectively, are operatively connected to a sliding contact 23 and to a constant resistance 24, respectively, of a feedback potentiometer 25. An amplifier and motor control device 26 is connected in circuit with the lead 18 and controls the operation of a servo motor 27 which both positions an indicator 28 and the sliding contact 23 of the potentiometer 25 through a belt 29. A quadrature adjust potentiometer 30, a zero adjust potentiometer 31, a double deck selector switch 32, and a span adjust resistance 33 are connected in the order named in circuit with the lead 19. The potentiometers 30 and 31 and the resistance 33 have sliding contacts 34, 35 and 36, which are adapted to be positioned manually.

The strain gage bridges 15 are supplied with alternating current from the secondary windings 37 of a power transformer (not shown) that has its primary windings (not shown) connected to terminals 38 and 39 which are connected in turn to a source of alternating current. The quadrature adjust potentiometer 30 and the zero adjust potentiometer 31 are energized by secondary windings 40 and 41, respectively, of the power transformer and the feedback potentiometer 25 is energized by the secondary windings 42 of the power transformer, the windings 42 being connected with the adjustable resistance 33 across the feedback potentiometer 25.

The series-connected bridges 15 form a balanceable network that is adapted to be unbalanced in response to changes in load applied to the load cells 2a, i.e., the network develops an output voltage between the leads 18 and 19 which is a function of load applied to the load cells. This output voltage opposes the output voltage of the feedback potentiometer 25, the potentiometer 25 driven by the servomotor 27 serving as a continuously automatically adjustable voltage source. The output voltage of the bridge network opposes the output of the feedback potentiometer circuit connected thereto to determine the flow of current through the amplifier and motor control device 26. An unbalance of the output voltages results in operation of the servomotor 27 to position the indicator 28 and the contact 23 until the opposing voltages are equal whereby input voltage to the amplifier 26 is reduced to null, i.e., the change in output voltage from stationary point A to positionable point B on the feedback potentiometer 25 effectively cancels out the voltage change from the load cells 2a as load changes upon the load cells. An adjustment of the contact 35 of the zero adjust potentiometer 31 results in a change in the positions of contact 23 to produce a balance for predetermined conditions to be measured. The positions of contact 23 are representative of the conditions measured, and a changing of these positions by adjustment of contact 35 merely results in an indication of the values from a different zero point, i.e., the zero adjust potentiometer 31 functions to adjust the weighing scale indicator 28 to zero indication on an indicia-bearing chart 43 when no load is upon the load cells 2a. The indicator 28 indicates the balancing or output voltage of the feedback potentiometer circuit in terms of weight. Alternatively, indicator 28 could be part of a printer which is set up by the servo motor. The span adjust resistance 33 functions to adjust the voltage across the potentiometer 25 so that the change in voltage between the points A and B on the potentiometer as the contact 23 is moved and the indicator 28 is moved therewith from a zero designation on the chart 43 to full chart capacity is equal to the change in load cell output voltage (sum of the four cells 2a) obtained by placing a weight equal to chart capacity upon the load cells.

The output voltage from the load cells 2a is shifted in phase relative to the reference or balancing voltage from the feedback potentiometer 25, the output voltage from the load cells leading or lagging the balancing voltage from the potentiometer because each set of load cells and its associated circuitry has its own peculiar circuit characteristics, since each installation has its own particular lengths of table, load cell internal resistance and wire resistances, and transformer inductances and resistance of the reference voltage wire or excitation wire for the transformer. Ideally at balance, the load cell output voltage and the balancing voltage are equal and opposite, i.e., 180 degrees apart. However, it is only by the most remote chance that the inherent circuit characteristics of the load cells and their associated circuitry could be such that there is no phase shift in the weight signal. This phase shift must be compensated to get accurate weight readings.

Phase shift in the weight signal is simple to compensate for because the phase shift is fixed since there is only a single set of load cells 2a in series having a constant source impedance. Considering the out-of-phase load cell output voltage as resolved into two components, a first 180 degrees and a second 90 degrees apart from the reference or balancing voltage, the first component is canceled but the second cannot be canceled by the reference or balancing voltage. Such second component, i.e., the 90 degree phase component or quadrature component, is canceled by means of the quadrature adjust potentiometer 30. The quadrature adjust potentiometer 30 functions to adjust the quadrature voltage to a level which will not affect gain of the amplifier 26, i.e., saturate the amplifier. As long as the amplifier is not saturated, the servo motor is not affected by stray quadrature voltage so that the servo system can tolerate a certain amount of quadrature voltage.

When the selector switch 32, which comprises a first deck 44 having four terminals or contacts 45, 46, 47 and 48 and a second deck 49 having four terminals or contacts 50, 51, 52 and 53, is in the position shown in FIG. II and when the zero adjust potentiometer 31, the span adjust resistance 33 and the quadrature adjust potentiometer 30 are properly adjusted, the weight of any load that is placed upon the load cells 2a and that is within the capacity of the chart 43 is indicated by the indicator 28 on the chart. Such capacity is so chosen that suitable sensitivity of indication is given. When very heavy loads are weighed, the capacity of the weighing scale is increased without decreasing the sensitivity of indication by means of the selector switch 32 and the circuit associated therewith.

The decks 44 and 49 of the selector switch 32 move as a unit and when contacts 45 and 50 of the switch are closed, as shown in FIG. II, the feedback potentiometer 25 is energized through leads 54 and 55 by the secondary windings 42 to such a level that the output voltage of the potentiometer can exactly balance the output voltage of the bridges 15 for any load within the capacity of the chart 43. Contacts 46, 47 and 48 of the first deck 44 of the switch 32 are connected to variable resistances 56, 57 and 58, respectively, which resistances are connected in turn along with a constant resistance 59 in parallel across the secondary windings 42, and in parallel across the feedback potentiometer 25. The variable resistances are adapted to be manually adjustable and their sliders are so positioned, as determined by trial, that the voltage between contacts 45 and 46, for example, is equal to the voltage change of the feedback potentiometer 25 from zero to full chart capacity. By turning the selector switch 32, the movable contact of which is in series with the potentiometers 30 and 31, to close contact 46 such additional fixed increment of voltage may be added to the output voltage of the feedback potentiometer 25 to change, e.g., to double, the capacity of the weighing scale. The resistances 56, 57 and 58 may be pictured as one resistance in parallel across the feedback potentiometer 25 and the movable contact of the first deck 44 of the switch 32 as a slider contacting such resistance. Thus, with a load equal to chart capacity upon the load cells 2a and with the selector switch 32 turned to close contact 46 the indicator 28 points to the zero indicium on the chart 43. Similarly, the selector switch 32 may be turned to pick off fixed increments of voltage from contacts 47 and 48, the voltage added by closing contact 47 being larger than the one added by closing contact 46 and the voltage added by closing contact 48 being larger than the one added by closing contact 47.

As shown in FIG. II, the selector switch 32 may be used to pick off and add any one of three fixed increments of voltage to the output voltage of the potentiometer 25 to increase the capacity of the weighing scale, for example, from 1000 pounds capacity with contact 45 closed, to 2000 pounds capacity with contact 46 closed, to 3000 pounds capacity with contact 47 closed, or to 4000 pounds capacity with contact 48 closed or, for example, to increase the capacity of the weighing scale from 2000 pounds capacity with contact 45 closed, to 4000 pounds capacity with contact 46 closed, to 6000 pounds capacity with contact 47 closed, or to 8000 pounds capacity with contact 48 closed. Steps of any suitable size may be chosen by the proper design of the circuit which comprises the resistances 56, 57, 58 and 59.

As hereinbefore described, the span adjust resistance 33 functions to adjust the voltage across the feedback potentiometer 25 so that the change in voltage between the points A and B on the potentiometer as the contact 23 is moved and the indicator 28 is moved therewith from a zero designation on the chart 43 to full chart capacity is equal and opposite to the change in load cell output voltage (sum of the four cells 2a) obtained by placing a weight equal to chart capacity upon the load cells. However, the load cell output voltage is not linear over the entire load cell range which may be utilized by increasing the capacity of the weighing scale beyond that of the chart 43. In a weighing scale, an error in linearity may be defined as a half capacity load indication which is not equal to the average of the zero and full capacity load indications. The second deck 49 of the selector switch 32 and the circuit associated therewith are used to adjust the span every time that the capacity of the scale is changed, i.e., the second deck 49 functions to adjust the voltage across the feedback potentiometer 25 so that it always matches the load cell output voltage.

The contacts 50, 51, 52 and 53 of the second deck 49 of the selector switch 32 are connected to resistances 60, 61, 62 and 63, respectively, which may be connected in parallel by the switch across a constant resistance 64 connected in series between the span adjust resistance 33 and the potentiometer 25. The decks 44 and 49 of the selector switch 32 move as one. When contacts 45 and 50 are closed, sliding contact 36 is used to adjust the span as hereinbefore described. When contacts 46 and 51 are closed, current is shunted around resistance 64 through a lead 65 and through resistance 61. Similarly, when contacts 47 and 52 are closed and when contacts 48 and 53 are closed, current is shunted around resistance 64 through the lead 65 and through resistances 62 and 63, respectively. Variable resistances 61, 62 and 63 are adapted to be manually adjustable and their sliders are so positioned, as determined by trial, that the span is automatically and correctly adjusted every time that the capacity of the weighing scale is varied to compensate for the non-linearity in the load cell output over the load cell range.

If the leads 18 and 19 are disconnected from the terminals 20 and 21, respectively, of the servo system and if terminals 66 and 67 in the scale head 22 (FIG. I) are connected to such terminals 20 and 21, respectively, of the servo system and if terminals 38 and 39 of the servo system are disconnected from the primary windings (not shown) of the power transformer (not shown) and if such terminals 38 and 39 are connected to terminals 68 and 69, respectively, of the load cell circuitry shown in FIG. I the weighing system having the plurality of weighing stations 1 but only the single scale head 22 of the invention results. The servo system shown in FIG. II when connected to the multiple weighing station circuitry shown in FIG. I functions in the same manner as when connected to the single weighing station circuitry shown in FIG. III. Leads 6 and 9 are connected together and leads 10 and 13 are connected together and leads 5 and 14 terminate at terminals 67 and 66, respectively, as shown in FIG. I connecting the load cells 2 in the three weighing stations 1 in series circuit with the servo system.

The strain gage bridges in the left hand pit 1, like the strain gage bridges 15 (FIG. III), each is supplied with alternating current from a secondary winding of a power transformer that has its primary windings 70 located in the housing 4, there being a secondary winding for each strain gage bridge as shown in FIG. III. Similarly, there are primary windings 71 located in the housing 8 and primary windings 72 located in the housing 12 for the strain gage bridges in the middle and right hand pits 1, respectively. Scale selector switches 73, 74 and 75 are provided for energizing selectively any one or any combination of the primaries 70, 71 and 72. Alternatively, a selector switch having three decks may be substituted for the three selector switches for energizing the primaries successively and then simultaneously as the three-decked switch is turned. Alternating current for the primaries 70, 71 and 72 is supplied from the alternating current sources shown in FIG. II, since terminals 68 and 69 are in circuit with the primaries are connected to terminals 38 and 39, respectively, of the servo system. When contact 76 of switch 73 is closed, primary 70 is energized. When contact 77 of switch 74 is closed, primary 71 is energized. When contact 78 of switch 75 is closed, primary 72 is energized. If the switches 73, 74 and 75 are ganged to move as one, in the position shown in FIG. I, primary 70 is energized and primaries 71 and 72 are deenergized. Rotation of the switches in a clockwise direction to close contact 77 energizes primary 71, primaries 70 and 72 being deenergized in such position of the switches. Further rotation of the switches to close contact 78 energizes primary 72, primaries 70 and 71 being deenergized in such position of the switches. Further rotation of the switches to close contacts 79, 80 and 81 energizes all of the primaries.

When loads are upon the weighbridges, energization of the primary 70, or the primary 71, or the primary 72 produces an output voltage or weight signal between the leads 5 and 6, or between the leads 9 and 10 or between the leads 13 and 14, respectively. Each of these weight signals may be shifted in phase relative to the reference or balancing voltage from the feedback potentiometer 25, the weight signals leading or lagging the balancing voltage. Lead is corrected by increasing cable capacity. This is accomplished by putting a capacity 82 across the leads 5 and 6 of a size to correct for any lead in the weight signal associated with leads 5 and 6, by putting a capacitor 83 across the leads 9 and 10 of a size to correct for any lead in the weight signal associated with the leads 9 and 10, and by putting a capacitor 84 across the leads 13 and 14 of a size to correct for any lead in the weight signal associated with the leads 13 and 14. Lag is corrected by putting resistance in series with the primaries 70, 71 and 72. This is accomplished by putting a resistor 85 in series with the primary 70 of a size to correct for any lag in the weight signal associated with the leads 5 and 6, by putting a resistor 86 in series with the primary 71 of a size to correct for any lag in the weight signal associated with the leads 9 and 10, and by putting a resistor 87 in series with the primary 72 of a size to correct for any lag in the weight signal associated with the leads 13 and 14. Any phase shift which may appear after the corrections are made is compensated by means of the quadrature adjust potentiometer 30. Such phase shift which may appear after the corrections are made is fixed because of the series circuit arrangement and is, therefore, simple to compensate. One of the features of the weighing system is the foregoing improved circuitry for correcting phase shift in a weight signal. It has been found that the phase correction circuit, which corrects for lead by increasing cable capacity and which corrects for lag by increasing the resistance of a transformer primary, corrects phase shift in a weight signal without affecting linearity of the load cell output voltage.

Another feature of the weighing system is in the arrangement of a plurality of weighing stations so arranged that there is a constant source impedance regardless of the number of stations in operation. This results in any one or in any combination of weighing stations producing the same phase shift in the weight signal. The constant source impedance is produced by connecting the load cells 2 in the three weighing stations 1 in series circuit in the scale head 22 as shown in FIG. I. When loads are upon the weighbridges, energization of any one or all of the primaries 70, 71 and 72 produces an output voltage between the terminals 66 and 67 in the scale head 22 which are connected to the servo system. Since the load cells are connected in series circuit, a constant source impedance is seen when looking at the terminals 66 and 67. Energization of primary 70 produces a weight signal between the terminals 66 and 67 which is a function of the total load applied to the four load cells in the left hand pit 1. Energization of primary 71 produces a weight signal between the terminals 66 and 67 which is a function of the total load applied to the four load cells in the middle pit 1. Energization of primary 72 produces a weight signal between the terminals 66 and 67 which is a function of the total load applied to the four load cells in the right hand pit 1. Energization of all of the primaries produces a weight signal between the terminals 66 and 67 which is a function of the total load applied to the twelve load cells. Because of the constant source impedance, any one or any combination of the primaries can be energized without changing the phase shift in the weight signal. Since the phase shift is fixed, once the quadrature adjust potentiometer 30 is adjusted it need not be changed when the several primaries are successively and simultaneously energized.

Another feature of the weighing system is in the arrangement of a plurality of weighing stations operatively connected to a single scale head, the scale head functioning to read out any one or any combination of the weighing stations. Heretofore, there has been no practical electrical or electronic weighing system having a plurality of weighing stations but only a single scale head. In the ordinary electrical or electronic weighing scale exemplified by the scale which results when the four series-connected load cells 2a (FIG. III) are connected to terminals 20 and 21 of the servo system (FIG. II), phase shift in the weight signal is simple to compensate because the phase shift is fixed. However, if such a weighing scale is provided with several weighing stations and each weighing station is connected successively to the servo system forming, in effect, several ordinary weighing scales and then connected simultaneously to the servo system forming, in effect, still another ordinary weighing scale, phase shift in the weight signals are not simple to compensate because there is a different phase shift associated with each of the weighing stations.

In the operaton of the multiple-pit-single-scale-head weighing system of the invention a truck tractor and trailer is driven onto the three weighbridges which are supported by the load cells in the pits 1, one weighbridge being provided for each set of wheels on the truck tractor and one weighbridge being provided for the wheels of the trailer. The primaries 70, 71 and 72 are energized successively and then simultaneously by manipulations of the switches 73, 74 and 75 producing four weight signals three of which are functions of the axle loads applied to the respective weighbridges and the last of which is a function of the total load applied to the three weighbridges. These weight signals are opposed by balancing voltages supplied by the servo system, the balancing voltages being indicated in terms of weight by the indicator 28 on the chart 43 at the scale head 22 to give three axle load weight readings and one total truck and trailer weight reading.

The embodiment of the invention herein shown and described is to be regarded as ilustrative only, and it is to be understood that the invention is susceptible to variation, modification, and change within the spirit and scope of the subjoined claims.

Having described the invention, I claim:

1. A weighing system comprising, in combination, a plurality of weighing stations each including transducer means, the transducer means being in series circuit, means for energizing the transducer means selectively, energized ones of the transducer means producing output voltages which are functions of loads applied to the respective weighing stations and which add to form a total output voltage, and servo means for reading out the total output voltage in terms of weight.

2. A weighing system comprising, in combination, a plurality of weighing stations each including transducer means, the transducer means being in series circuit, means for energizing the transducer means selectively, energized ones of the transducer means producing output voltages which are functions of loads applied to the respective weighing stations and which add to form a total output voltage, adjustable means in circuit with the transducer means for supplying a balancing voltage in opposition to the total output voltage, servo means in circuit with both the transducer means and the adjustable means for adjusting the adjustable means in a balancing direction in response to differences between voltages, and a member coupled to the servo means movable according to the balancing voltage in terms of weight.

3. A weighing system comprising, in combination, a plurality of weighing stations each including a set of series-connected strain gage load cells, the sets of load cells being in series circuit, a power transformer for each set of load cells having secondary windings for energizing each of the load cells in the set and primary windings for energizing the secondary windings, means for energizing the primary windings selectively, energized ones of the sets of load cells producing output voltages which are functions of loads applied to the respective weighing stations and which add to form a total output voltage, and servo means for reading out the total output voltage in terms of weight.

4. A weighing system comprising, in combination, a plurality of weighing stations each including a set of series-connected strain gage load cells, the sets of load cells being in series circuit, a power transformer for each set of load cells having secondary windings for energizing each of the load cells in the set and primary windings for energizing the secondary windings, means for energizing the primary windings individually and simultaneously, energized ones of the sets of load cells producing output voltages which are functions of loads applied to the respective weighing stations and which add to form a total output voltage, adjustable means in circuit with the load cells for supplying a balancing voltage in opposition to the total output voltage, servo means in circuit with both the load cells and the adjustable means for adjusting the adjustable means in a balancing direction in response to differences between voltages, and a member coupled to the servo means movable according to the balancing voltage in terms of weight.

5. A weighing system comprising in combination, a plurality of weighing stations each including transducer means, means for energizing the transducer means individually and in combination, the transducer means forming a source having a constant impedance regardless of the number of transducer means energized, energized ones of the transducer means producing output voltages which are functions of loads applied to the respective weighing stations, and servo means for reading out the output voltages in terms of weight.

6. A weighing system comprising, in combination, a plurality of weighting stations each including transducer means, the transducer means being in series circuit whereby the transducer means form a source having a constant impedance regardless of the number of transducer means energized, means for energizing the transducer means individually and in combination, energized ones of the transducer means producing output voltages which are functions of loads applied to the respective weighing stations and which add to form a total output voltage, and servo means for reading out the total output voltage in terms of weight.

7. A weighing system comprising, in combination, a plurality of weighing stations each including transducer means, means for energizing the transducer means individually and in combination, the transducer means forming a source having a constant impedance regardless of the number of transducer means energized, energized ones of the transducer means producing output voltages which are functions of loads applied to the respective weighing stations and which add to form a total output voltage, adjustable means in circuit with the transducer means for supplying a balancing voltage in opposition to the total output voltage, servo means in circuit with both the transducer means and the adjustable means for adjusting the adjustable means in a balancing direction in response to differences between voltages, and a member coupled to the servo means movable according to the balancing voltage in terms of weight.

8. A weighing system comprising, in combination, a plurality of weighing stations each including a set of series-connected strain gage load cells, a power transformer for each set of load cells having secondary windings for energizing each of the load cells in the set and primary windings for energizing the secondary windings, means for energizing the primary windings individually and in combination and thereby for energizing the sets of load cells individually and in combination, the sets of load cells being arranged to form a source having a constant impedance, energized ones of the sets of load cells producing output voltages which are functions of loads upon the respective weighing stations and which add to form a total output voltage, and servo means for reading out the total output voltage in terms of weight.

9. A weighing system according to claim 1 wherein means are provided for varying the phase of the output voltages produced by the transducer means.

10. A weighing system according to claim 5 wherein means are provided for varying the phase of the output voltages produced by the transducer means.

References Cited in the file of this patent

UNITED STATES PATENTS

| | | |
|---|---|---|
| 2,579,632 | Vore et al. | Dec. 25, 1951 |
| 2,813,709 | Brier | Nov. 19, 1957 |
| 2,883,617 | Lathrop | Apr. 21, 1959 |

FOREIGN PATENTS

| | | |
|---|---|---|
| 451,786 | Great Britain | Aug. 12, 1936 |